July 26, 1927.  E. REISZ  1,637,243

NONRESONANT DIAPHRAGM

Filed Dec. 1, 1926

Inventor
Eugen Reisz
By Munn & Co.
Attorneys

Patented July 26, 1927.

1,637,243

UNITED STATES PATENT OFFICE.

EUGEN REISZ, OF BERLIN-DAHLEM, GERMANY.

NONRESONANT DIAPHRAGM.

Application filed December 1, 1926, Serial No. 152,026, and in Germany November 12, 1925.

This invention relates to a non-resonant diaphragm which is adapted for use in electric microphones and receivers generally and which permits the tone values of spoken words or music to be transmitted in a manner which is extremely natural.

The invention consists essentially in the fact that carbon granules of various sizes are stuck down onto a thin and unstretched skin of rubber or like material, said granules not being mutually united by the adhesive medium.

Figure 1:
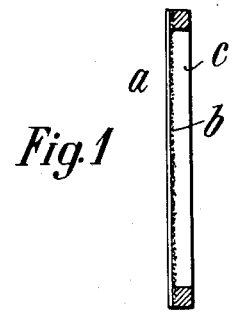
Figure 2:
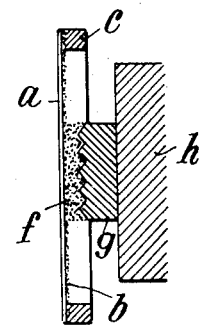

An example of a diaphragm constructed according to my invention is illustrated on the drawing in which Figure 1 is a diagrammatical view in vertical section, Figure 2 shows a microphone provided with my improved diaphragm.

To an unstretched or only slightly stretched rubber skin $a$ (Figure 1) of about 0,1 millimetres of thickness, carbon granules $b$ of various degrees of coarseness are applied and are affixed to the rubber skin by means of an adhesive medium (rubber solution, for instance). This may be suitably effected by first of all spreading rubber solution over the rubber skin, while the latter is maintained in a stretched condition, and then sprinkling the carbon granules thereupon. After the rubber solution has dried, the rubber skin is released from tension and stuck onto a metal ring $c$ in such manner that the layer of carbon granules is conductively connected to the said metal ring.

Such a diaphragm oscillates without any particular frequency being accentuated, a phenomenon which is attributable to the fact that the individual carbon granules can oscillate independently of each other. Since, moreover, the carbon granules are of various sizes, they thus provide a very large number of oscillating elements of which the natural periods of oscillation differ materially one from another. The period of oscillation of such an element, that is to say, a carbon granule in combination with the corresponding rubber surface about 0,5 millimetres of diameter, is proportional to $$\sqrt{mf}$$

where $m$ is the mass and $f$ the stiffness factor of the small rubber surface. Since $m$ is very small and $f$ very large, the very small area of diaphragm under consideration must necessarily have an oscillation period of very small value, for example, 1/8000 second.

As stated above, it is important that the carbon granules be stuck only to the rubber skin and that they do not stick together. If, for instance, the carbon granules on the rubber skin were given an additional or superficial coating of rubber solution, so as to deprive them of their independent movement, the diaphragm would no longer function without resonance.

Figure 2 shows a microphone provided with the diaphragm of this invention. The carbon granule layer $b$, stuck to the rubber skin $a$ bears, through the medium of an interposed layer $f$ of granulated carbon, upon a fixed carbon block $g$, supported upon a fixed and vibrationless base $h$.

The pulverulent conductor $b$ may either consist of carbon granules or of finely powdered metal. Care must be taken, however, that the individual particles are only very loosely connected in order to avoid sound figures in the diaphragm.

I claim:

1. A non-resonant diaphragm, characterized by the fact that carbon granules of various sizes are stuck onto thin unstretched skin of non-resonant material, said granules being disconnected from each other.

2. A microphone having a diaphragm according to claim 1, characterized in that the carbon granule covered skin, through the medium of another mass of granulated carbon, bears upon a fixed carbon block supported upon a vibrationless base member.

3. A non-resonant diaphragm according to claim 1, characterized in that the pulverulent conductor is applied to a very thin and elastic insulating layer, for instance a rubber skin.

4. A non-resonant diaphragm, comprising a thin piece of elastic material having finely reduced conducting material secured to one face with the particles thereof disconnected from each other.

5. A non-resonant diaphragm, comprising a thin piece of elastic material having granulated carbon secured to one face with the granules of carbon disconnected from each other.

6. A non-resonant diaphragm, comprising a thin piece of rubber or like material having carbon granules secured on the entire surface of one face with the granules disconnected from each other, and a metallic ring to which the piece of rubber is secured with the granules of carbon engaging said ring.

In testimony whereof I have signed my name to this specification.

EUGEN REISZ.